(12) United States Patent
Leflour et al.

(10) Patent No.: US 11,495,133 B2
(45) Date of Patent: Nov. 8, 2022

(54) AIRCRAFT ENHANCED VISION SYSTEM, RELATED AIRCRAFT, AND VISION PROCESS

(71) Applicant: DASSAULT AVIATION, Paris (FR)

(72) Inventors: Gérard Leflour, Saint Cloud (FR);
Jérôme Lagarde, Saint Cloud (FR);
Paul Soudais, Saint Cloud (FR);
Nicolas Moulin, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 319 days.

(21) Appl. No.: 16/821,361

(22) Filed: Mar. 17, 2020

(65) Prior Publication Data
US 2020/0302807 A1 Sep. 24, 2020

(30) Foreign Application Priority Data

Mar. 18, 2019 (FR) .................................... 19 02748

(51) Int. Cl.
*G08G 5/00* (2006.01)
*G01C 23/00* (2006.01)
*B64D 45/08* (2006.01)
*H01Q 1/28* (2006.01)

(52) U.S. Cl.
CPC ........... *G08G 5/0086* (2013.01); *B64D 45/08* (2013.01); *G01C 23/005* (2013.01); *G08G 5/0021* (2013.01); *H01Q 1/281* (2013.01); *H01Q 1/286* (2013.01)

(58) Field of Classification Search
CPC .... G08G 5/0086; G08G 5/0021; B64D 45/08; G01C 23/005; H01Q 1/281; H01Q 1/286
See application file for complete search history.

(56) References Cited

U.S. PATENT DOCUMENTS

| 8,570,210 B1 | 10/2013 | Fonder et al. |
| 8,747,321 B2 * | 6/2014 | Sankar ................. A61B 8/4483 600/443 |
| 9,384,586 B1 * | 7/2016 | McCusker .............. G06T 15/20 |

(Continued)

FOREIGN PATENT DOCUMENTS

FR 2996522 A1 4/2014

OTHER PUBLICATIONS

Search Report for priority application FR 1902748.
(Continued)

*Primary Examiner* — Peter D Nolan
*Assistant Examiner* — Demetra R Smith-Stewart
(74) *Attorney, Agent, or Firm* — Davidson, Davidson & Kappel, LLC

(57) ABSTRACT

An aircraft enhanced vision system includes an electromagnetic sensor comprising at least one group of transmitters and at least one group of receivers. The electromagnetic sensor includes a waveform generation assembly powering each transmitter in order to generate the transmitted signal and a signal capture assembly to capture the signal received by each receiver after reflection off of the ground. The transmitters are distinct and spaced apart from the receivers, being arranged so as to form at least one virtual transmitter/receiver network extending in an elongation direction perpendicular to the observation direction from each transmitter/receiver combination between the group of transmitters and the group of receivers.

20 Claims, 10 Drawing Sheets

(56) References Cited

U.S. PATENT DOCUMENTS

| 9,759,810 B1* | 9/2017 | Sankar .................... G01S 17/58 |
| 2014/0097295 A1 | 4/2014 | Bouffanais et al. |
| 2015/0081143 A1* | 3/2015 | Snow ................... G08G 5/0021 |
| | | 701/16 |
| 2018/0284222 A1 | 10/2018 | Garrec et al. |
| 2021/0141241 A1* | 5/2021 | Allio ..................... H04N 13/31 |

OTHER PUBLICATIONS

Ranking G A et al: "Radar imaging: Conventional and MIMO", Communication and Electronics (ICCE), 2010 Fourth International Conference on, IEEE, Aug. 1, 2012, pp. 171 to 176.

Tospann F-J et al. "Multifunction 35 GHZ FMCW Radar with Frequency Scanning Antenna Forsynthetic Vision Applications", Visual Communications and Image Processing; Jan. 1, 2004, vol. 2463, Apr. 17, 1995, pp. 28 to 37.

* cited by examiner

AIRCRAFT ENHANCED VISION SYSTEM, RELATED AIRCRAFT, AND VISION PROCESS

The present disclosure concerns an enhanced aircraft vision system, including:
- at least a vision sensor of a ground in an observation direction, the ground being located in front of and below the aircraft;
- a processing unit able to form a reflectivity map of the ground from data collected by the vision sensor;
- a display of ground images reconstituted by the processing unit from the reflectivity map and/or of information characteristic of the ground, created by the processing unit from the reflectivity map, the display being intended to be placed in a cockpit of the aircraft.

The present disclosure applies to aircraft used in civil aviation, in particular business aviation.

Such a system is intended, in particular, to provide the crew of the aircraft with enhanced vision of the surroundings of the aircraft during the approach and running stages when there is little or no visibility. In particular, the system is intended to obtain an image of the ground and, in particular, of a runway as the aircraft approaches the runway, and/or a display of characteristics of the runway, such as its contour, axis, and/or threshold positioned in relation to the aircraft.

BACKGROUND

Aircraft frequently operate in unfavourable weather conditions, including low cloud, fog, and/or rain.

Ground-based aircraft guidance systems exist to allow the crew to reach a runway, including in very poor visibility conditions. However, few runways have such systems given the costs of obtaining and maintaining such a system.

One alternative to guidance system sis a vision system using one or more sensors on board the aircraft, which allow the pilot to visualise the runway with sufficient advance notice to decide whether to continue the low-altitude approach all the way to landing. The vision system is also useful for the pilot to gain an understanding of the ground in the vicinity of the runway.

These vision systems are generally referred to as EFVS ('Enhanced Flight Vision System').

For example, known enhanced vision systems use optronic sensors in the visible and infrared ranges. These systems are generally able to produce a high-quality image for the crew. However, in some particularly poor conditions, in particular when there is dense fog and/or a low cloud ceiling, the performance of optical systems limits their utility to the crew.

Furthermore, aircraft are generally equipped with weather radars having mechanically scanned antennas.

The angular resolution of these radars is too low to obtain an image of sufficient quality to carry out a safe approach in poor visibility conditions. To improve the resolution, it would be necessary to significantly increase the size of the antenna, which would render it incompatible with an aircraft. Moreover, the mechanical scanning principle used by these radars offers an image refresh rate that is too low due to the mechanical inertia of the antenna during changes in scanning directions.

Radars and radiometers operating at higher transmission frequencies than weather radars (e.g. Ka or W bands) may be more compact. However, these sensors are not capable of carrying out the functions of weather radars; as such, the latter must be kept aboard the aircraft. Sensors with higher transmission frequencies thus also raise integration issues due to insufficient space being available on the aircraft. In addition, there is the difficulty of designing a radome that is both transparent in these frequency bands and has the mechanical and aerodynamic properties necessary in order to incorporate it into an aircraft.

SUMMARY

One objective of the present disclosure is to provide an enhanced vision system having adequate range and resolution to observe a runway during an approach, even under very poor weather conditions, the system being reduced in size and having an increased refresh rate and few or no moving parts.

To this end, an enhanced vision system of the aforementioned type is provided, characterised in that the vision sensor is an electromagnetic sensor comprising a plurality of transmitters of a transmitted signal, the transmitters forming at least one group of transmitters, and a plurality of receivers of a received signal, resulting from the transmitted signal following reflection off of the ground, the receivers forming at least one group of receivers, the electromagnetic sensor including a waveform generation assembly powering each transmitter in order to generate the transmitted signal and an assembly to capture the signal received by each receiver after reflection off of the ground, the transmitters being distinct and spaced apart from the receivers, being arranged so as to form, from each combination of a transmitter and of a receiver, between the group of transmitters (and the group of receivers, at least one virtual transmitters/receivers network extending along an elongation direction perpendicular to the observation direction, the linear density of virtual transmitters/receivers in the network along the elongation direction being greater than the linear density of transmitters in the group of transmitters along the elongation direction and being greater than the linear density of receivers in the group of receivers along the elongation direction.

The system according to the invention may comprise one or more of the following features, taken individually or in all combinations technically possible:
- the transmitters are arranged at a first pitch n.P along the elongation direction in the group of transmitters, the receivers are arranged at a second pitch m.P along the elongation direction in the group of receivers, wherein the numbers n and m are prime to another integers, the network of virtual transmitters/receivers formed from each combination of a transmitter and a receiver having a pitch P/2 along the elongation direction;
- the network of virtual transmitters/receivers is arranged in a line or pseudo-line along the elongation direction;
- the electromagnetic sensor includes a first group of transmitters and at least one second group of transmitters, wherein the adjacent groups of transmitters are separated by a gapped area without transmitters or receivers in the gapped area, and/or the electromagnetic sensor includes a first group of receivers and at least one second group of receivers, wherein the adjacent groups of receivers are separated by a gapped area without transmitters or receivers in the gapped area,
- the network of virtual transmitters/receivers includes a first subnet exclusively comprising virtual transmitter/receivers resulting from interactions between a transmitter of the first group of transmitters and a receiver of a group of receivers, and a second subnet exclusively including virtual transmitters/receivers resulting from the interaction of a transmitter of the second group of transmitters and a receiver of the same group of receivers, wherein the first subnet of the network of virtual transmitters/receivers extends as a continuation of the second subnet of the network of virtual transmitters/receivers;

or the network of virtual transmitters/receivers includes a first subnet exclusively comprising virtual transmitter/receivers resulting from interactions between a transmitter of a group of transmitters and a receiver of the first group of receivers, and a second subnet exclusively including virtual transmitters/receivers resulting from the interaction of a transmitter of the same group of transmitters and a receiver of the second group of receivers, wherein the first subnet of the network of virtual transmitters/receivers extends as a continuation of the second subnet of the network of virtual transmitters/receivers;

the vision sensor includes an optical sensor that is arranged in the gapped area;

the group of transmitters is arranged along a line of transmitters, in particular a curved line having a concavity, and the group of receivers is arranged along a line of receivers, in particular a curved line having a concavity;

a group of transmitters to be placed on one of an upper surface or a lower surface of a skin of a substantially frustoconical intermediate area of a front tip of the aircraft and at least one group of receivers to be placed on the other of an upper surface or the lower surface of the skin of the substantially frustoconical intermediate area;

the or each group of transmitters is to be placed on an upper surface of a skin of a substantially frustoconical intermediate area of a front tip of the aircraft, wherein the or each group of receivers is to be placed on a lower surface of the skin of the substantially frustoconical intermediate area;

or the or each group of transmitters is to be placed on a lower surface of a skin of a substantially frustoconical intermediate area of a front tip of the aircraft, wherein the or each group of receivers is to be placed on an upper surface of the skin of the substantially frustoconical intermediate area;

each transmitter is formed by a flush mount antenna that transmits by skimming, the antenna lacking any moving parts;

the waveform generation assembly is able to simultaneously generate waveforms at frequencies with a constant offset over time for several transmitters of the group of transmitters;

the waveform generation assembly is able to generate a periodic frequency-modulated carrier signal with a periodic waveform having an increasing and/or decreasing frequency over each period of the waveform for each transmitter;

the capture assembly is able to generate a signal representative of a frequency difference between the transmitted signal and the received signal at all times, wherein the frequency difference between the transmitted signal and the received signal is representative of the time lag between the transmitted signal and the received signal;

the processing unit includes a component for separating the transmitted signal by each transmitter in the signal received on each receiver in order to restore the signal received by each virtual transmitter/receiver, and a component for filtering the signals received by the virtual transmitters/receivers depending on the direction relative to the observation direction, in particular depending on a bearing relative to the observation direction;

the image of the ground restored by the processing unit from the reflectivity map includes a runway, and/or the information obtained from the reflectivity map restored by the processing unit is features of a runway, in particular its contour, threshold, and/or its axis; and the or each network of virtual transmitters/receivers is continuous;

the ground image reconstituted by the processing unit defines a contour of a runway.

An enhanced vision system as defined above is also provided, wherein the display is arranged in a cockpit of the aircraft.

The aircraft according to the invention may comprise one or more of the following features, taken individually or in all combinations technically possible:

it comprises a substantially frustoconical area of a front tip, wherein at least one first group selected from a group of transmitters and a group of receivers is placed on an upper surface of a skin of the frustoconical intermediate region, wherein a second group selected from the group of transmitters and the group of receivers is placed on a lower surface of the skin of the substantially frustoconical intermediate area.

the electromagnetic sensor has no moving parts.

A method for enhanced vision in an aircraft is also provided, including the following steps:

providing a vision system as defined above;

powering each transmitter of the group of transmitters by the waveform generation assembly and capturing, by each receiver of the group of receivers, a transmitted signal following reflection off of the ground;

processing, by the processing unit, the transmitted signal and the received signal in order to obtain the signals received on the network of virtual transmitters/receivers extending in an elongation direction transverse to the observation direction, reconstituting a reflectivity map based on the signals received on the network of virtual transmitters/receivers;

displaying, in a cockpit of the aircraft, images of the ground reconstituted by the processing unit based on the reflectivity map or information obtained from ground images reconstituted by the processing unit based on the reflectivity map.

BRIEF DESCRIPTION OF THE DRAWINGS

The invention will be better understood based on the following description, which is provided by way of example only and without limitation, and by reference to the attached drawings, which show.

DETAILED DESCRIPTION

Figure 1:
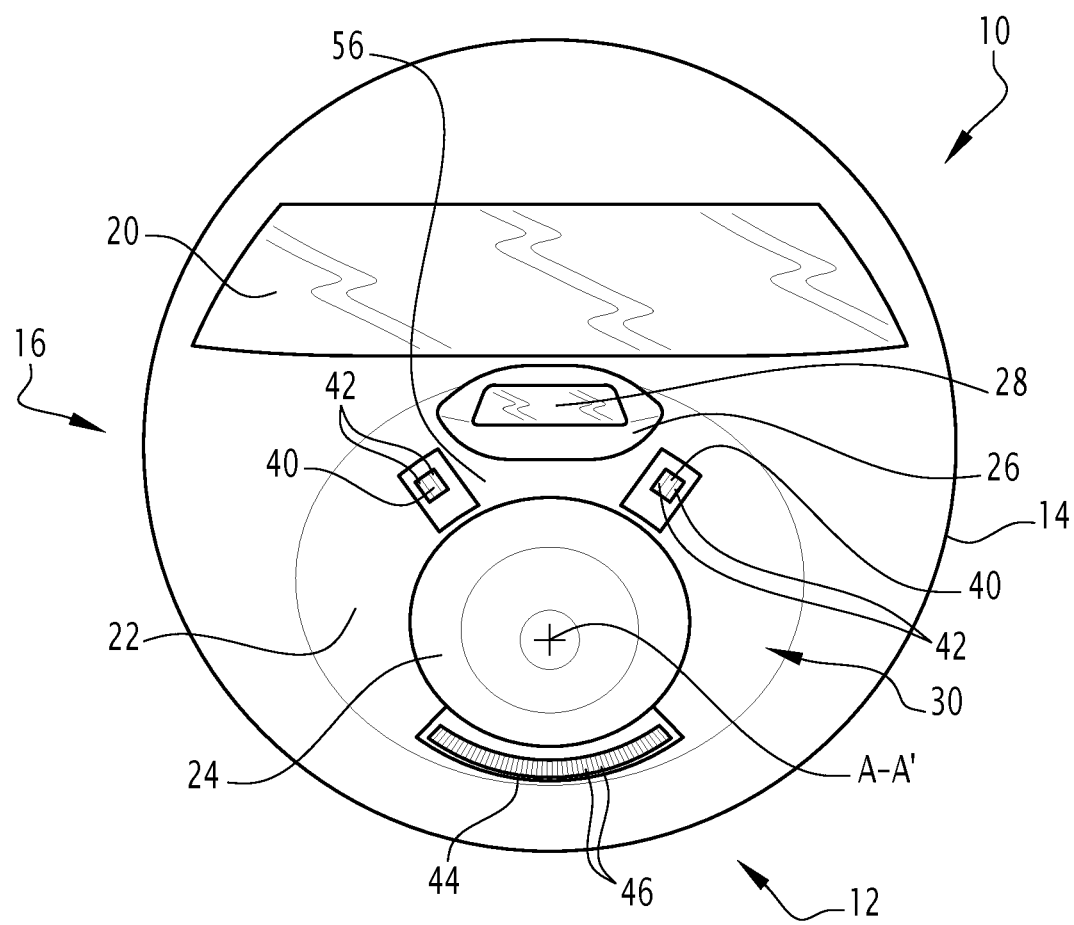
FIG. 1 is a front view of a first aircraft equipped with an enhanced vision system according to an embodiment of the invention.
Figure 2:
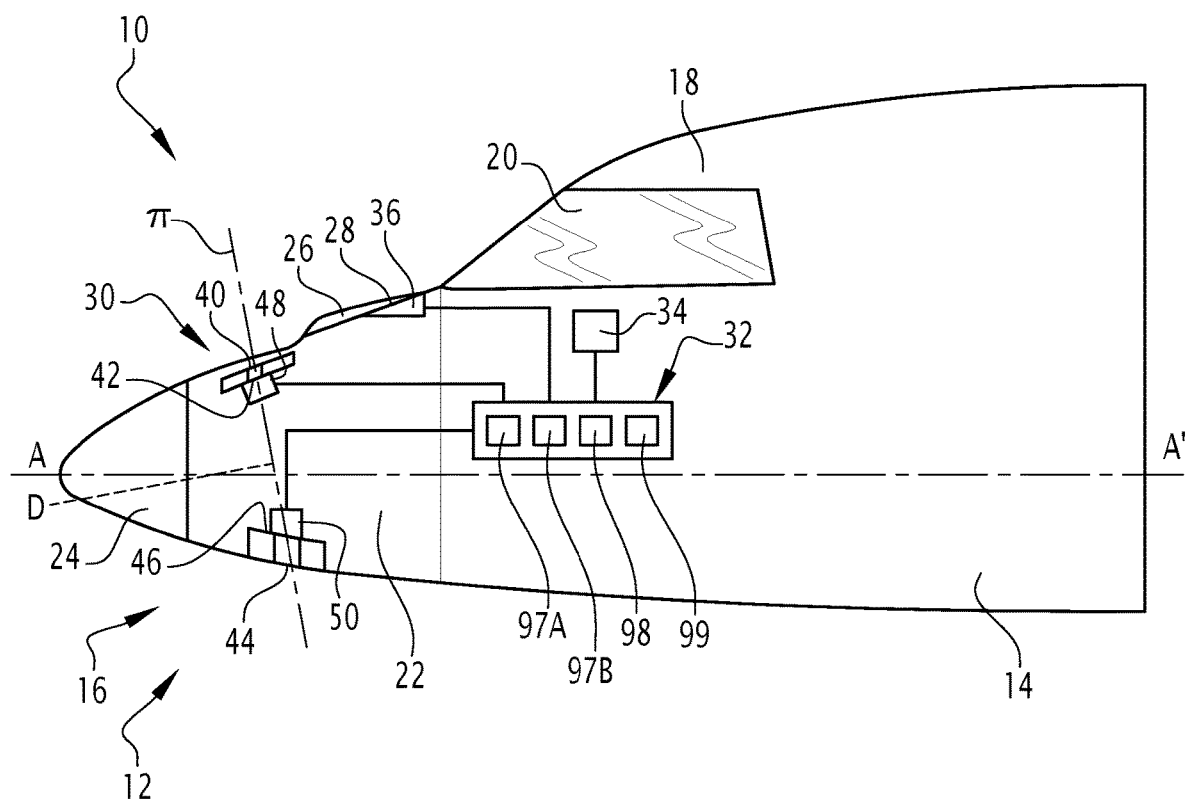
FIG. 2 is a side view of the aircraft of FIG. 1.

An aircraft 10, equipped with an enhanced vision system 12 according to an embodiment of the invention, is shown schematically in FIGS. 1 and 2.

The aircraft 10 includes a fuselage 14, at the front of which is a front tip 16 arranged upstream of a cockpit 18 of the aircraft.

The cockpit 18 includes, as is known, a windscreen 20 allowing the members of the crew to observe the outside of the aircraft.

In front of the windscreen 20, the front tip 16 includes a nose cone consisting of a substantially frustoconical intermediate area 22 and a radome 24 that closes off the intermediate area 22 at the front end of the aircraft 10.

The radome 24 is made of a material transparent to electromagnetic waves at the frequencies corresponding to those of a weather radar.

For example, the intermediate area 22 is made of metal. In this example, it defines a recess 26 closed in the rear by a window 28.

For example, the recess 26 is as described in the applicant's French application FR 2 996 522.

The vision system 12 is intended to provide the crew of the aircraft with enhanced vision of the environment in front of the aircraft. In particular, the vision system 12 is intended to provide an image of the ground in front of and below the aircraft 10. The image illustrates the actual appearance of the ground, in particular that of a runway and the ground surrounding the runway. To this end, the angular resolution of the image obtained is, e.g., in the range of 0.2-1.2°.

In particular, the vision system 12 is able to observe the ground that is advantageously at a distance of less than 5000 m from the aircraft in a bearing between −20° and +20° relative to a central observation direction D.

The ground is, e.g., an airfield on which the aircraft is preparing to land or on which the aircraft is taxiing, with the obstacles included therein.

The vision system 12 includes an electromagnetic sensor 30 able to transmit electromagnetic signals to the ground and collect the signals reflected off of the ground, a processing unit 32 able to process the reflected signals in order to form a reflectivity map of the adjacent terrain, and a display 34 to show a real-time image of the ground formed by the processing unit 32 based on the reflectivity map and/or information obtained from the reflectivity map reconstituted by the processing unit 32 based on data received from the electromagnetic sensor 30.

Advantageously, the vision system 12 further includes an optical sensor 36 connected to the processing unit 32 and the display 34. The assembly of optical sensors 36 operates advantageously in the visible and/or near-infrared and/or infrared ranges.

Figure 3:
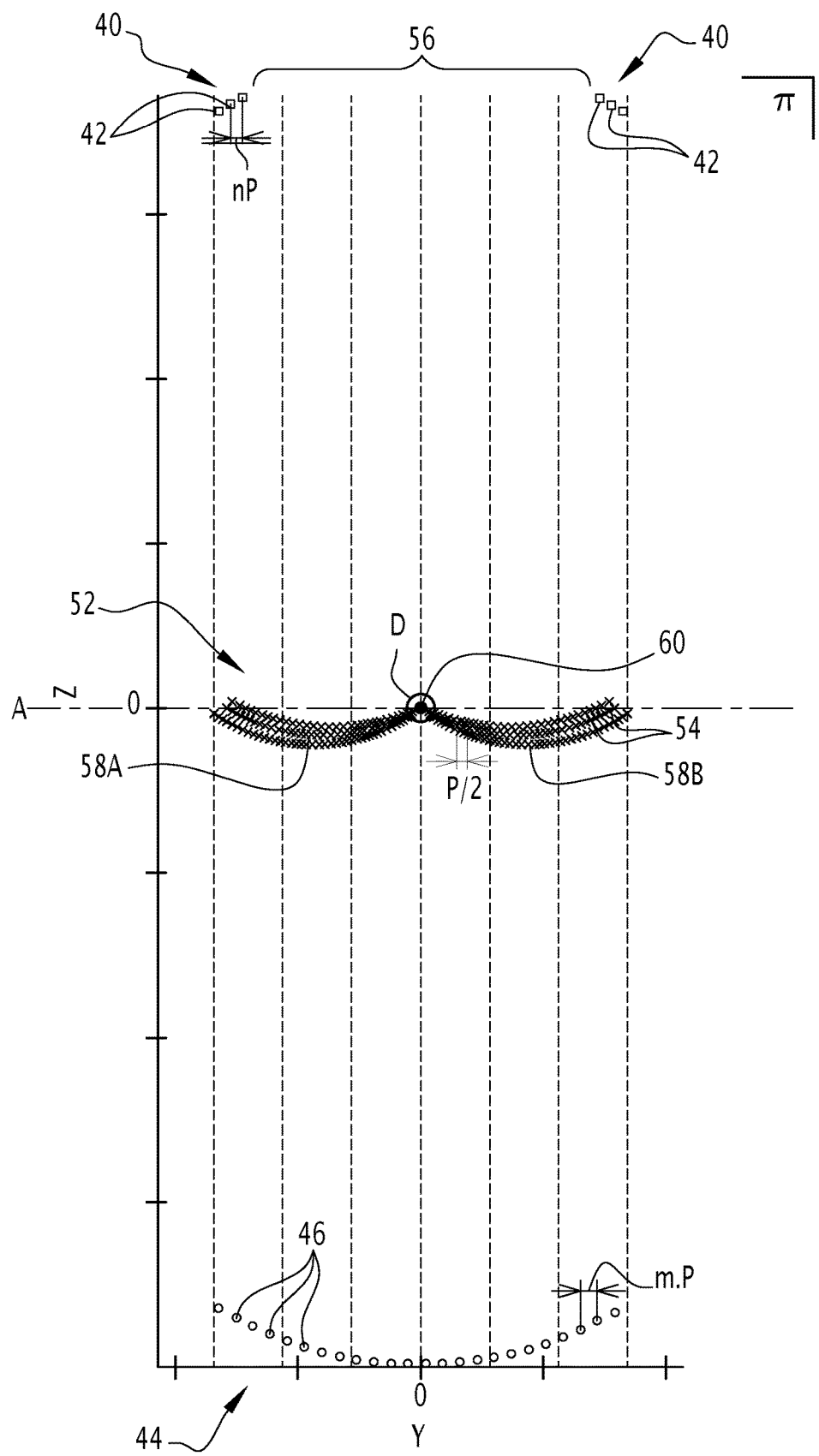
FIG. 3 is a front view illustrating the lines of transmitters, the line of receivers, and the network of virtual transmitters/receivers of the electromagnetic sensor of the shown in FIGS. 1 and 2.

Referring to FIGS. 1 and 3, the electromagnetic sensor 30 includes at least one group of transmitters 42 to transmit an electromagnetic signal, in particular a line 40 of transmitters 42 to transmit an electromagnetic signal towards the ground, and at least one group of receivers 46, in particular a line 44 of receivers 46, wherein the receivers 46 are intended to receive the signals reflected off of the ground, the transmitters 42 being arranged at a distance from the receivers 46.

The lines 40, 44 are formed in a transverse plane π that is substantially perpendicular to the axis A-A' of the airplane (see FIG. 2), e.g. forming an angle of between 75° and 90° with the axis A-A' of the airplane. The central observation direction D is perpendicular to the plane π.

The electromagnetic sensor 30 further includes a waveform generation assembly 48 able to power each transmitter 42 simultaneously and a assembly 50 for capturing the signal received by each receiver 46 following reflection off of the ground.

As shown in FIG. 3, the transmitters 42 are distinct and spaced apart from the receivers 46. The transmitters 42 are being arranged so as to form, from each combination of a transmitter 42 and a receiver 46, a continuous network of virtual transmitters/receivers extending between the group of transmitters 42 and the group of receivers 46 in an elongation direction A transverse to the observation direction D. The elongation direction A is perpendicular to the observation direction D, and is horizontal when the axis A-A' of the airplane is horizontal and the wings are flat.

Preferably, the transmitters 42 are arranged at a first pitch n.P on each line 40, with the receivers 46 being arranged at a second pitch m.P on the line 44, wherein the pitches n.P and m.P are measured by projection along the elongation direction A.

This results in at least one line or pseudo-line 52 of virtual transmitters/receivers 45 at a pitch P/2 between each line 40 of transmitters 42 and each line 44 of receivers 46. The numbers n and m are prime to one another integers, e.g. 3 and 5, 2 and 3, or 3 and 2.

The pitch P/2 is a distance that is generally less than the wavelength of the transmitted signal, in particular between 0.4 and 0.6 times the wavelength of the transmitted signal.

For example, each transmitter 42 consists of an elementary antenna that is flush with the skin of the intermediate area 22 and has no retraction mechanism. Each elementary antenna transmits by skimming at a skimming angle between, e.g., 5 and 30°. The skimming angle is defined as the angle relative to the plane that is tangential to the surface of the elementary antenna on the skin of the intermediate region 22.

The skin of the aircraft is the outer surface of the aircraft that is in contact with the air mass in which the aircraft is moving.

One example of an antenna is a leaky wave antenna. This example of an antenna offers the advantage of being flush, which allows for the impact of its incorporation into an aircraft, e.g., the obstruction of the aerodynamic air flow on the aircraft surface, to be minimised. Advantageously, the antenna includes an elongated dielectric with metallised surfaces. A network of slits is formed in the metallisation of the upper surface. The length of the slits, as well as that of the guide, follow a gradual course law configured such that the slits will not create return waves. The elementary antenna includes an upstream resonant cavity powering the waveguide and a downstream resonant cavity to collect the residual energy and dissipate it in a charge so as not to create return waves in the guide.

Likewise, the receivers 46 are flush with the skin of the intermediate area 22 and have no retraction mechanism. They have a surface that is nearly perpendicular to the direction of reception. They are formed from the same elementary antennas as the transmitters 42.

In the example shown in FIG. 1, each line of transmitters 42 is arranged on an upper surface of the skin of the intermediate region 22 above the axis A-A' of the airplane, with the line of transmitters 46 being arranged on a lower surface of the skin of the intermediate region 22, below the axis A-A' of the airplane.

Here, each line 40 of transmitters 42 and each line 44 of receivers 46 is a curved line. For example, the curved line is a circular arc. Advantageously, the curve is adapted to the shape of the airplane, in particular to minimise the impact of the incorporation of the antennas on the airplane.

Taking into account their position, the line 40 of transmitters 42 here has a concavity in the direction of the axis A-A' of the airplane, and the line 44 of receivers 46 also has a concavity in the direction of the axis A-A' of the airplane and of the concavity of the line 40 of transmitters 42.

Because the transmitters 42 of each line 40 are spaced apart from the receivers 46 of each line 44, transmissions made using the transmitters 42 and received by the receivers 46 create the dense network of virtual transmitters/receivers 54 in their barycentre.

Thus, the network of virtual transmitters/receivers 54 results from successive interactions of each transmitter 42 with a plurality of receivers 46 of the line 44, advantageously with all of the receivers 46 of the line 44, in order to form the line 52 of virtual transmitters/receivers 54 at their barycentre.

The network of virtual transmitters/receivers 54 is continuous. To this end, the maximum distance between two adjacent virtual transmitters/receivers 54, projected along the elongation direction A, is advantageously less than the pitch P defined above.

The linear density of the virtual transmitters/receivers 54 in the continuous network of virtual transmitters/receivers 54, projected along the elongation direction A, is greater than the linear density of transmitters 42 in the group of transmitters 42, projected along the elongation direction A, and is greater than the linear density of receivers 46 in the group of receivers 46, projected along the elongation direction A.

Thus, the number of physical radiating transmitters 42 remains quite limited relative to the number of virtual radiating transmitters/receivers 54.

This reduces the cost of the system and simplifies its incorporation in an aircraft.

This results in a pitch P/2 of the network of virtual transmitters/receivers 54 that could not be easily achieved with a physical network of antennas and would be considerably more expensive.

In the example shown in FIG. 3, the sensor 30 includes a first line 40 of transmitters 42 arranged on one side of a vertical plane passing through the axis A-A' of the airplane and a second line 40 of transmitters 42 arranged on the other side of the vertical plane passing through the axis A-A' of the airplane and symmetric with the first line 40.

Together, the lines 40 of transmitters 42 define a gapped area 56 in which there are no transmitters 42. Advantageously, this gapped area 56 is intended for receiving the optical sensor 36 when such a sensor 36 is present on the aircraft.

Advantageously, the gapped area 56 has a width, measured parallel to the elongation direction A, that is greater than 5 times the pitch P.

In this example, taking into account the arrangement in the intermediate area 22, the first line 40 of transmitters 42 and the second line 40 of transmitters 42 are arranged substantially on arcs of the same circle projected in the plane π containing the transmitters 42. Likewise, the line 44 of transmitters 46 is arranged substantially on an arc of the same circle.

In this configuration, the network of virtual transmitters/receivers 54 forms a line or pseudo-line 52 extending along the elongation direction.

When it forms a 'pseudo-line', the network of virtual transmitters/receivers 54 generally has a height, measured perpendicular to the elongation direction A in the plane π, that is less than, advantageously less than 0.1 times, the longitudinal extent of the network of virtual transmitters/receivers 54, taken along the elongation direction A.

In particular, the height of the network of virtual transmitters/receivers 54 is less than 10 times the pitch P.

The network of virtual transmitters/receivers 54 includes a first lateral subnet 58A resulting from interactions between each transmitter 42 of the first line 40 of transmitters 42 and each receiver 46 of the line 44 of receivers 46, and a second lateral subnet 58B comprising virtual transmitters/receivers 54 resulting from the interaction between a transmitter 42 of the second line 40 of transmitters 42 and the receivers 46 of the line 44.

Figure 8:
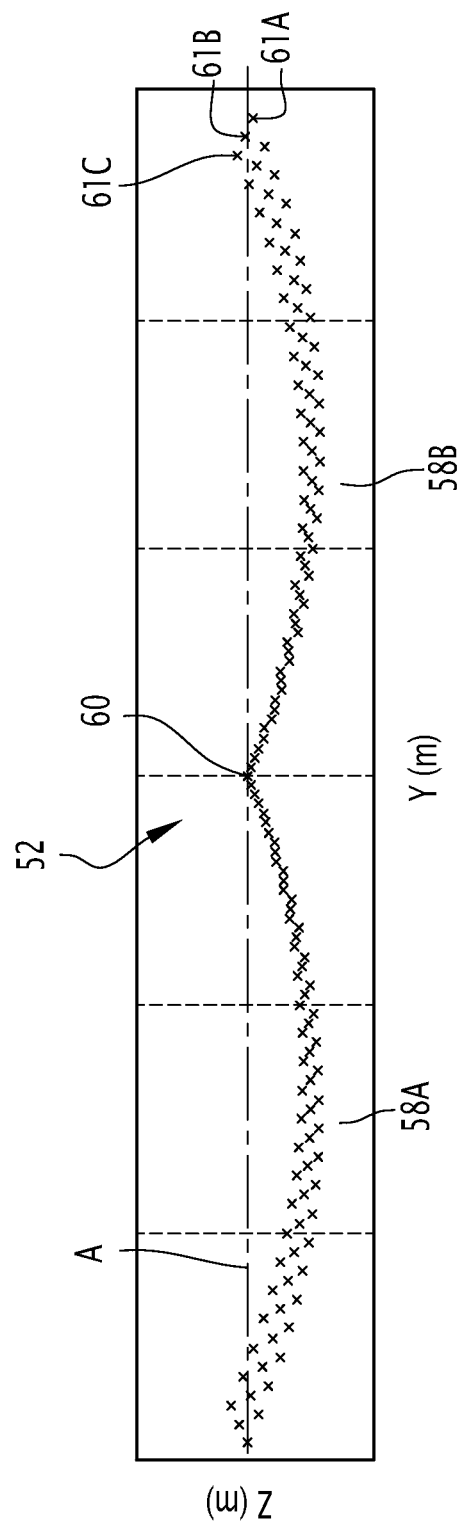
FIG. 8 is a detail view of FIG. 3, showing details of the network of virtual transmitters/receivers of the electromagnetic sensor of the system according to the invention.

In the example shown in FIGS. 3 and 8, the subnets 58A, 58B have a common end 60. The subnets 58A, 58B each comprise a plurality of lines 61A, 61B, 61C of virtual transmitters/receivers 54 that at least partially overlap towards the common end 60 and diverge away from the common end 60. Each line 61A, 61B, 61C results from the interaction between a single transmitter 42 of the second line 40 of transmitters 42 and a plurality of receivers 46 of the line 44, advantageously all of the receivers of the line 44.

Thus, the subnets 58A, 58B form a pseudo-line as defined above with slight vertical dispersion despite the curvature of the lines 40 of transmitters 42 and the line 44 of receivers 46.

The relative position of the line 40 of transmitters 42 and the line 44 of receivers 46 maximises the decoupling between the transmitters 42 and the receivers 46 by placing the transmitters 42 above the axis A-A' of the airplane and the receivers 46 below the axis A-A' of the airplane. Furthermore, the gapped area 56 allows for the inclusion of another sensor, in particular the optical sensor 36, without any interactions between the transmitters 42 of each line 40 and the receivers 46 of the line 44.

The number of physical transmitters 42 is minimised. For example, each line 40 of transmitters 42 advantageously includes between 2 and 10 transmitters, in particular three transmitters 42.

The line 44 of receivers 46 includes a number of receivers 46 that is advantageously greater than the number of transmitters 42. The number of receivers 46 is, for example, greater than 10, in particular equal to 24. The number of receivers 46 remains less than 40.

Thus, a line 52 of virtual transmitters/receivers 54 including more than 50 transmitters/receivers 54 is formed, in particular one including 138 virtual transmitters/receivers 54 in the example of FIG. 3.

The waveform generation assembly 48 is able to simultaneously power each transmitter 42 of each line 40 with a periodic electromagnetic signal, in particular a sinusoidal signal, in particular in a frequency range between 8 GHz and 100 GHz, in particular between 28 GHz and 35 GHz, preferably between 31.8 GHz and 33.4 GHz.

Preferably, the waveform generation assembly 48 is able to simultaneously power all of the transmitters 42 on spaced frequency bands at a frequency spacing that is, for example, greater than 20 KHz, in particular between 50 KHz and 150 KHz.

Thus, each transmitter 42 of each line 40 is able to transmit a frequency distinct from the other transmitters 42 of the line 40 at all times.

Preferably, the frequency of the transmitted signal is periodically modulated with a predetermined waveform. Advantageously, the waveform is continuous, e.g. FMCW (Frequency Modulation Continuous Wave).

Due to the continuous transmission, the peak power transmitted by the transmitters 42 is very low because it is equal to its average power. This offers a significant advantage in terms of electromagnetic compatibility for incorporation into the system, and also in terms of component cost.

Moreover, the sensor 30 has no blind range, i.e. no minimum detection distance. This allows it to be used even at a very short distance.

The frequency modulation of the periodic signal increases and/or decreases with each period of the waveform.

Figure 5:
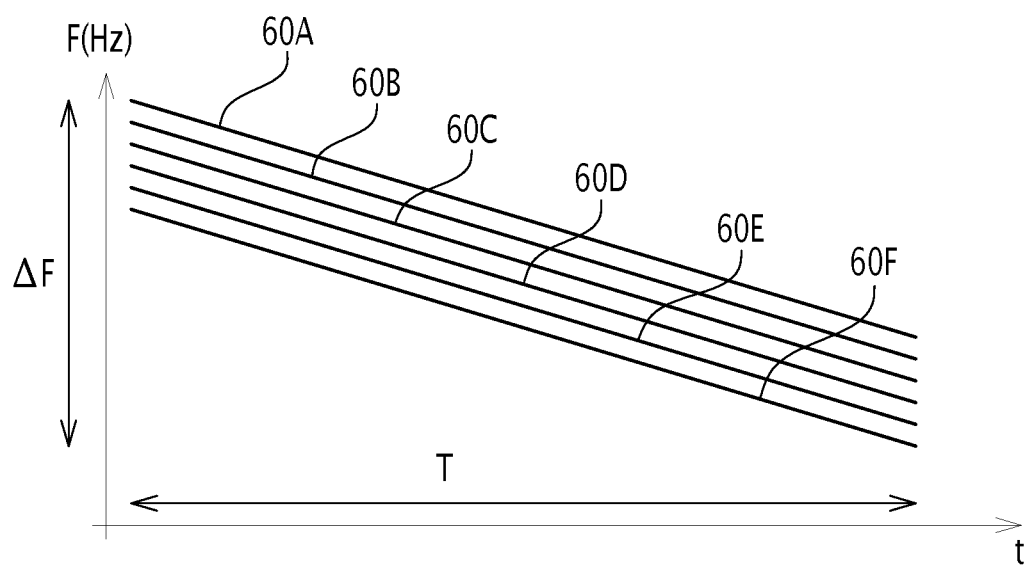
FIG. 5 is a view of the modulation frequency of the transmission signals of each transmitter as a function of time for a transmission period of each signal of a first waveform.

Advantageously, the modulation on one period T of the waveform is in the form of a linear ramp decreasing with each period T, as shown in FIG. 5, which shows the modulation frequency of the signals 60A, 60B, 60C, 60D, 60E, and 60F of the respective transmitters 42 of each line 40.

In this example, the variation of the frequency as a function of time is linear over the period T. The difference in frequency between the start of each period and the end of each period is, e.g., greater than 10 MHz, in particular between 12 MHZ and 350 MHz.

The signals 60A-60F are offset from one another at a frequency that remains constant over time.

Figure 9:
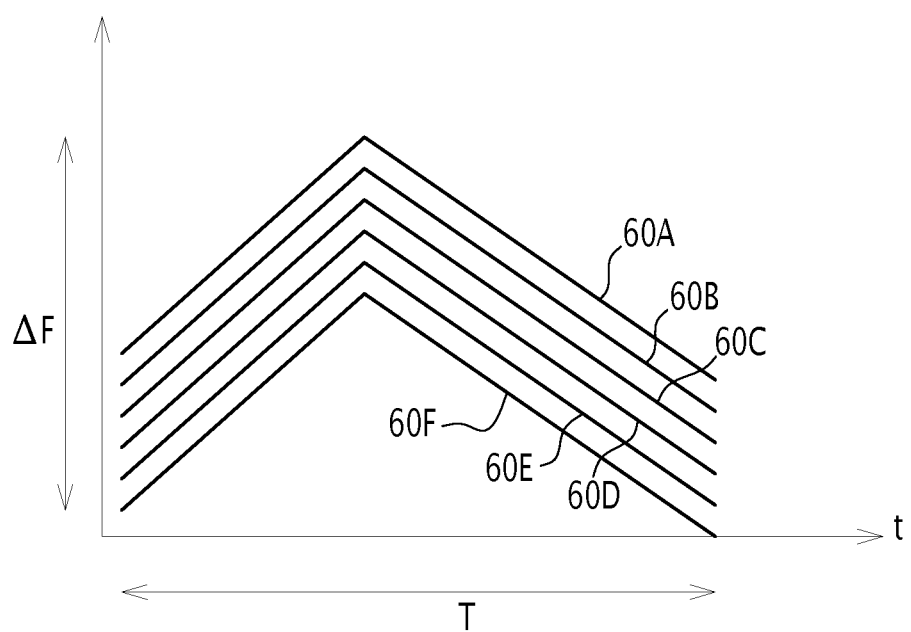
FIG. 9 is a view of a second waveform, analogous to FIG. 5.

In one variant, shown in FIG. 9, the frequency modulation of the periodic signal increases in a first part of the period T and decreases in a second part of the period T. Advantageously, it has an increasing linear ramp, followed by a decreasing linear ramp.

Figure 4:
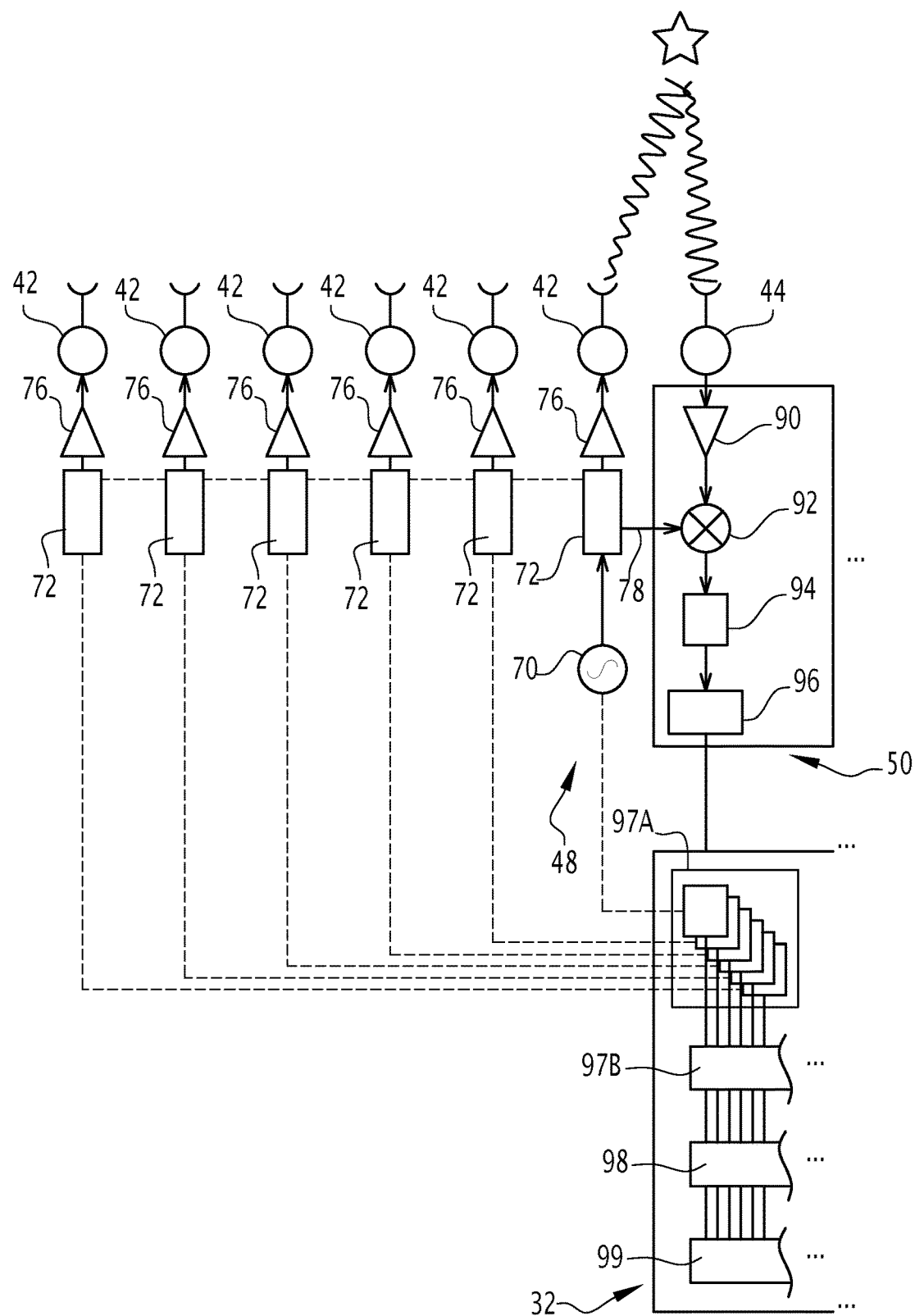
FIG. 4 is a schematic representation of the waveform generation assembly of the transmitters and the assembly for capturing the signals received by the receivers.

In the example shown schematically in FIG. 4, the waveform generation assembly 48 includes a reference oscillator 70, a generator 72 to generate waveforms from the signal generated by the oscillator 70, and, advantageously, a power amplifier 76.

The reference oscillator 70 is able to generate an excitation signal at a frequency, in particular, between 8 GHz and 100 GHz, in particular between 28 GHz and 35 GHz, preferably between 31.8 GHz and 33.4 GHz.

The generator 72 is able to create and ensure a waveform having a linear frequency modulation ramp as a function of time in each period T.

Advantageously, it includes a phase-locked loop and a modulator.

A conjugate 78 of the transmitted signal can be extracted from the generator 72 in order to be mixed with the signal received by the capture assembly 50.

The generator 72 is able to create the modulation ramp adapted to each transmitter 42 with the frequency shift being selected relative to the frequency modulation of the other transmitters 42.

The power amplifier 76 is arranged downstream of the modulated signal in order to amplify this signal and transmit it to the transmitter 42.

The signal transmitted by each transmitter 42 is thus a sinusoidal signal having a frequency with sawtooth modulation around a carrier.

The capture assembly 50 is able to capture the signals received by each receiver 46 following reflection off of the ground and to determine a delay $\delta t$ between the signals transmitted and the signals received.

The delay $\delta t$ generates a frequency shift between the signal transmitted by the transmitter 42 and the signal received by the receiver 46 that originates from the transmitter 42 at all times t.

Figure 6:
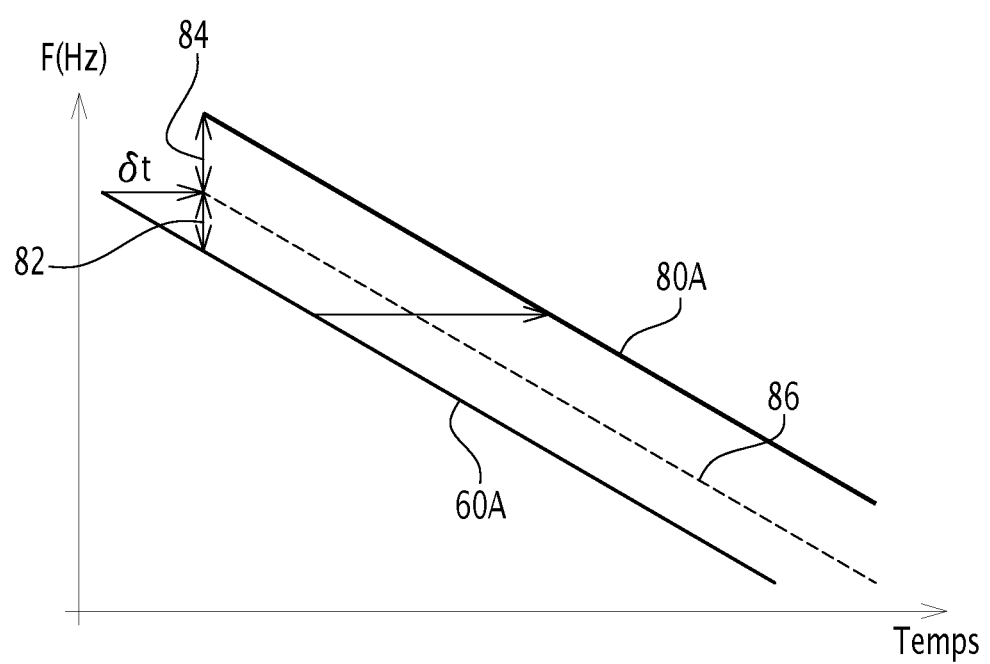
FIG. 6 shows the principle used in measuring the lag of the received signal following reflection relative to the transmitted signal.

As shown in FIG. 6, the frequency shift at all times t between the transmitted signal 60A and the received signal 80A resulting from the transmission of the signal 60A includes a contribution 82 related to the delay $\delta t$ of the received signal relative to the transmitted signal and a contribution 84 related to the Doppler effect due to the displacement of the aircraft 10 relative to the ground.

The Doppler contribution is calculated based on the known speed of the aircraft 10 relative to ground using a ground speed sensor present in the aircraft 10, in particular a GPS or an inertial unit.

Once this contribution has been calculated, the delay $\delta t$ is deducted from the frequency difference at all times between the transmitted signal 60A and the received signal 80A, corrected to account for the Doppler effect 86, by means of the equation:

$$\delta t = T \times \delta f / \Delta F$$

wherein $\Delta F$ is the maximum frequency variation of the signal transmitted over a period T of the waveform and $\delta f$ is the contribution 82.

To determine the contribution 82, the capture assembly 50 includes a low-noise amplifier 90 to amplify the signal received by each receiver 46, a mixer 92 to receive the conjugate 78 of the signal transmitted by one or more transmitters 42, a low-pass filter 94 to suppress the harmonics resulting from the mix in the mixer 92, and an analog-to-digital converter 96.

For example, the processing unit 32 includes a processor and a memory including software components able to be run by the processor. In one variant, the components are at least partially in the form of programmable logic components, or in the form of ASICs (Application-Specific Integrated Circuits).

The processing unit 32 includes a component 97A for separating the signals transmitted by each transmitter 42 from the signal received by each receiver 46 in order to restore the signal received by each virtual transmitter/receiver 54, and a component 97B for filtering each signal received by each virtual transmitter/receiver 54 depending on the direction relative to the observation direction, in particular depending on a bearing relative to the observation direction.

The processing unit 32 further includes a component 98 for calculating a rapid Fourier transform on the filtered signals to apply distance filtering and a component 99 for establishing an image of the ground based on direction-filtered signals.

For example, 97A is a frequency filter able to separate the signals received at each receiver 46 based on the offset frequencies transmitted by each transmitter 42 in order to generate the received signal at the corresponding virtual transmitter/receiver 54.

The component 97B is configured to carry out digital beam forming that is able to sort the signal based on the direction from which it was received.

Digital beam forming is able to capture the signals received at each virtual transmitter/receiver 54 and sort the information obtained in order to filter the signals based on the direction from which they were received, thus filtering them based on bearing.

The component 98 is able to apply a Fourier transform on the signal from each direction, thus obtaining a frequency line representative of the contribution of the delay 6t (the Doppler contribution having been extracted) in order to provide distance filtering.

The component 99 is able to obtain information on the power received from the components 97B and 98 based on direction and distance in order to construct a reflectivity map measured in the observation direction D. The component 99 is able to reconstitute an image with a contrast depending on the reflectivity measured in the observation direction D using the power received.

In particular, this contrast makes it possible to identify differences between a runway and access roads leading to the runway, generally with a lower reflectivity in the observation direction D, and the ground surrounding the runway, generally with a higher reflectivity in the observation direction D.

Thus, an image of the ground in the look direction of the sensor 30 may be obtained for a bearing, e.g., between −20° and +20° at distances of less than 5000 m and, in particular, between 5 m and 10,000 m.

Now, a method for enhanced vision executed using the vision system 12 according to an embodiment of the invention will be described in the context of an approach of the aircraft 10 to the ground.

When the crew encounter weather conditions that significantly decrease visibility, e.g. dense fog or a low cloud ceiling, they operate the enhanced vision system 12.

In this case, the waveform generation assembly 48 is activated. Advantageously, the reference oscillator 70 generates a periodic signal, in particular a sinusoidal signal, and this signal is modulated by the generator 72 at the frequency adapted to the corresponding transmitter 42 in the waveform discussed above.

Part of the signal is then conjugated in order to form a conjugated signal 78 to be sent to the capture assembly 50.

Each transmitter 42 of each line 40 is simultaneously powered in order to generate a periodic electromagnetic signal having a frequency that is modulated around a carrier in a continuous transmission waveform described above.

The periodic signal is generated in a frequency band between 8 GHz and 100 GHz, in particular between 28 GHz and 35 GHz, preferably between 31.8 GHz and 33.4 GHz.

As shown in FIG. 5, the modulation advantageously comprises, for each period of the waveform, a decreasing frequency ramp from a maximum frequency to a minimum frequency, or, as shown in FIG. 9, an increasing ramp followed by a decreasing ramp.

The frequency ramps 60A-60F of the various transmitters 42 are frequency-shifted relative to one another at a frequency shift, e.g., greater than 20 KHz, in particular between 50 KHz and 150 KHz.

The transmitted signal is reflected off of the ground in order to be continuously received at the receivers 46. This signal is delayed, which results in a linear frequency shift relative to the transmitted signal; this linear shift also includes a Doppler effect.

The assembly 50 captures each signal received at each receiver 46, and mixes these signals with one or more conjugates of the signals transmitted, in order to extract a signal that represents a frequency difference between the transmitted signal and the received signal. The low-pass filter 94 suppresses the harmonics resulting from the mixture. The signal obtained is then digitised in the analog-to-digital converter 96.

Taking into account the fact that the transmitters are arranged at a first pitch n.P on each line 40, and the receivers 46 are arranged at a second pitch m.P on the line 44, wherein m and p are each first, the signal transmitted from the transmitters 42 and received at the receivers 46 is equivalent to the signal that would have been received by a plurality of virtual transmitters/receivers 54 arranged at the barycentre of the physical transmitters 42 and receivers 46.

A continuous network of virtual transmitters/receivers 54 of a much greater density and a pitch equal to P/2 is thus formed with a virtual network pitch on the order of one half of the wavelength of the transmitted signal.

The component 97A of the processing unit 32 recovers all of the signals received at the virtual transmitters/receivers 54 at all times, and the component 97B forms a digital beam from the received signals in order to sort the signal based on the direction from which it was received.

The component 98 applies a Fourier transform to signals from each direction, thus filtering for distance.

The component 99 then collects information on power received from the components 97B, 98 based on distance and bearing, derives a reflectivity map from this, and forms an image based on the reflectivity map.

Images of the ground and/or information obtained based on the reflectivity map are shown on the display 34 at a frequency greater than 0.5 Hz, in particular greater than 2 Hz. This allows the crew to distinguish the details of the ground in front of and below the aircraft, in particular a contrast between the paving of a runway or an access road and the ground surrounding this paving.

Thus, the crew can observe the presence and location of a runway at an altitude sufficient to take a decision, even if the visibility is quite low, or even nearly nil.

In one variant, the optical sensor 36 is used in combination with, or as an alternative to, the electromagnetic sensor 30.

The arrangement of the optical sensor 36 in the gapped area 56 between the lines 44 of transmitters 42 avoids any mechanical interference between the optical sensor 36 and the electromagnetic sensor 30 whilst ensuring the proper operation of each of the individual sensors 30, 36.

Figure 7:
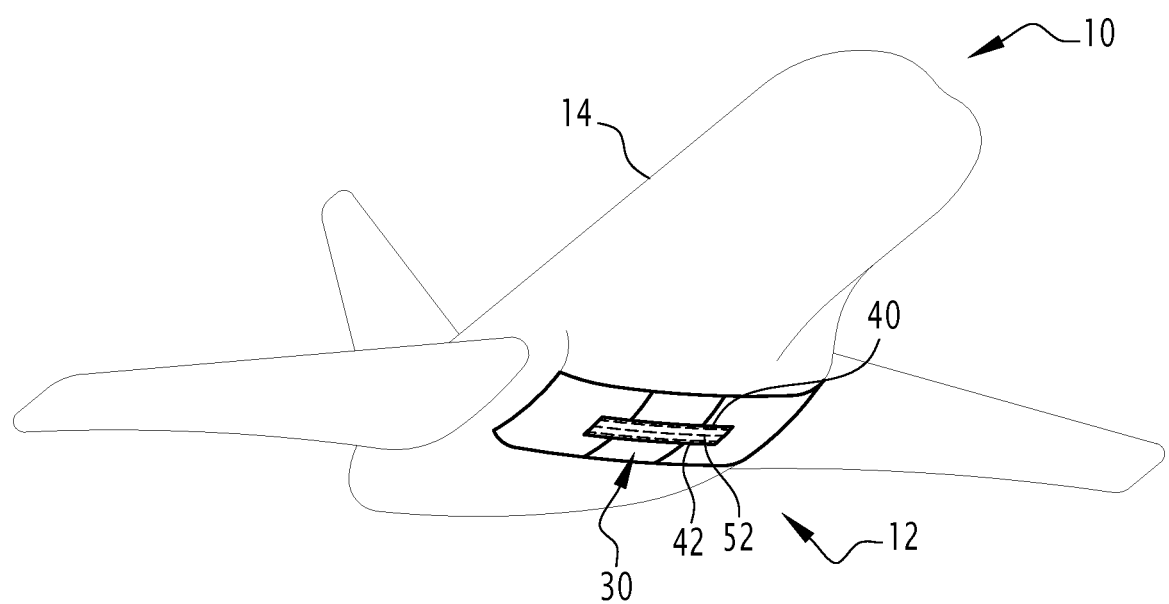
FIG. 7 is a schematic perspective view of an aircraft equipped with an enhanced vision system according to another embodiment of the invention.

In a variant shown in FIG. 7, the line 40 of transmitters 42 and the line 44 of receivers 46 of the electromagnetic sensor are positioned on a line arranged below the fairing (or Karman) of the aircraft. In this case, the lines 40, 44 are straight and parallel to one another. For example, the number of transmitters 42 is greater than or equal to the number described above, and the number of receivers 46 is greater than or equal to the number described above. In this case, the continuous network of transmitters/receivers 54 is a straight line 52 of virtual transmitters/receivers parallel to the lines 40, 44, and arranged between these lines 40, 44.

By being arranged below the fairing, it is possible to provide a linear electromagnetic sensor 30 having a significant length that allows for continuous visibility of the runway during the approach. The advantage of the significant length is that it provides a greater resolution of the image related to the bearing.

Thus, the system and method as described above make it possible to create an electromagnetic sensor 30 having a large number of virtual transmitters/receivers 54 with a density that ensures a maximum pitch sufficient to prevent the appearance of subnet lobes. This is achieved by installing a network of physical transmitters 42 and receivers 46 that is significantly dense in order to facilitate their incorporation into an aircraft 10.

The network of physical transmitters 42 and receivers 46 is also mounted flush and lacks moving parts. Thus, the electromagnetic sensor 30 can be easily installed on the aircraft without modifying its external structure or affecting its aerodynamic performance.

Simultaneously powering all of the transmitters 42 with a frequency modulation corresponding to each transmitter 42 corresponds to simultaneous transmission on a high-density network of virtual transmitters/receivers 54. This allows the processing unit 32 to form a beam digitally, thus obtaining an image with increased aperture relative to bearing and distance.

Digital beam forming also makes it possible to obtain view rates that cannot be achieved by a mechanically scanned antenna whilst avoiding the use of mechanical and moving parts.

Positioning it in the intermediate area 22 is also quite advantageous because it avoids couplings with other moving parts of the aircraft such as landing gear. It also allows for maximum decoupling between the transmitters 42 and the receivers 46. The presence of a gapped area 56 also makes it possible to include an optical sensor 36 without it interacting with the electromagnetic sensor 30.

Figure 10:
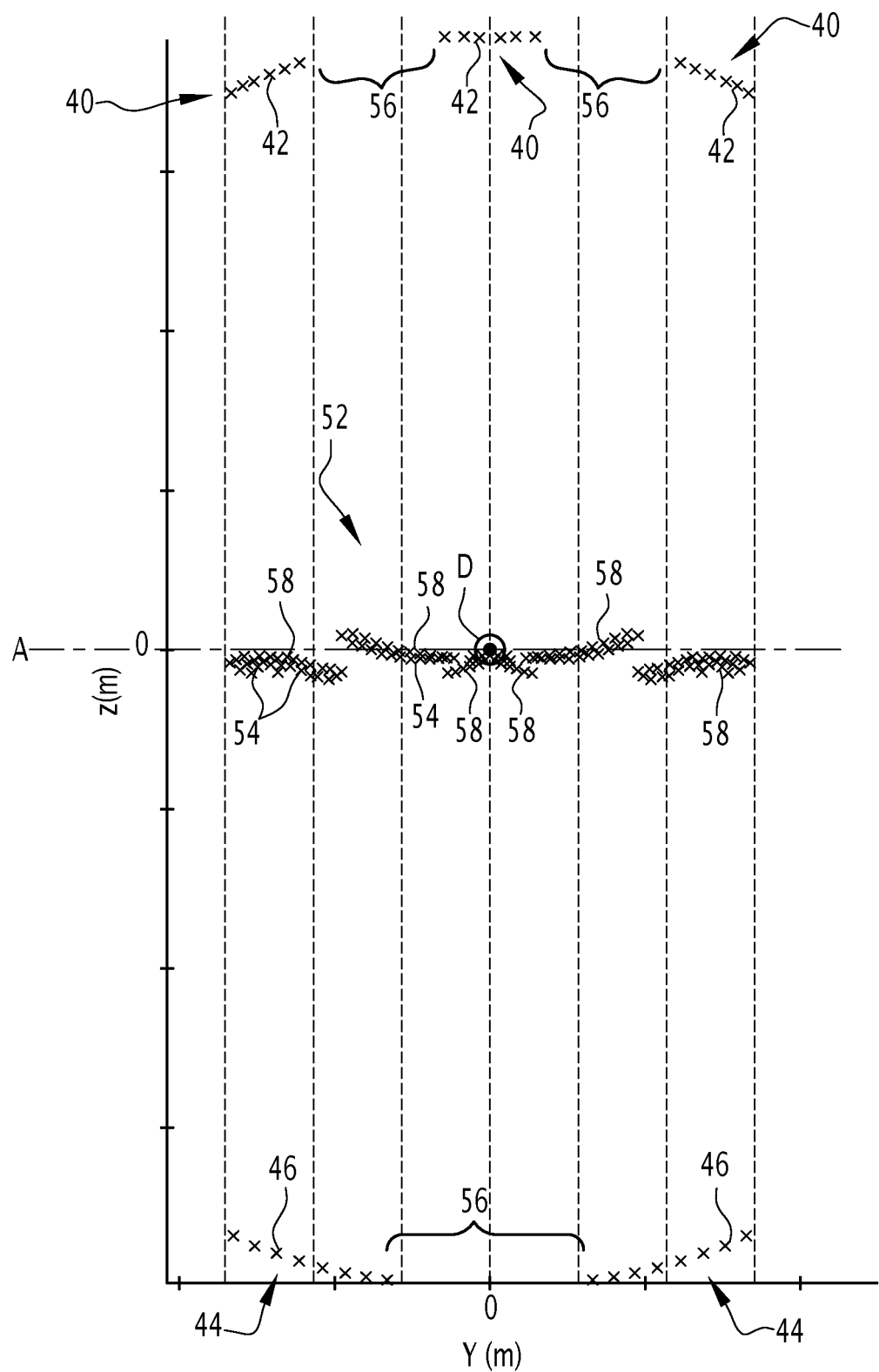
FIG. 10 is a view of a variant of an electromagnetic sensor, analogous to FIG. 3.

In a variant shown in FIG. 10, the sensor 30 includes a first line 44 of receivers 46 arranged on one side of a vertical plane passing through the axis A-A' of the airplane and a second line 44 of receivers 46 arranged on another side of the vertical plane passing through the axis A-A' of the airplane and symmetric with the first line 44.

Together, the lines 44 of receivers 46 define a gapped area 56 without transmitters 42, having a width, parallel to the elongation direction A, greater than 5 times the pitch P.

In this case, the sensor 30 includes a third line 40 of transmitters 42 that is located between the first line 40 of transmitters 42 and the second line 40 of transmitters 42.

Together, the first line 40 and the third line 40 define a gapped area 56 having a width, parallel to the elongation direction A, that is greater than 5 times the pitch P.

Together, the third line 40 and the second line 40 define a gapped area 56 having a width, parallel to the elongation direction A, that is greater than 5 times the pitch P.

Despite the presence of the gapped areas 56 between the lines 40 of transmitters 42 and between the lines 44 of receivers 46, the subnets 58 consisting of virtual transmitters/receivers 54 resulting from the interaction between the transmitters 42 of a single line 40 and the receivers 46 of a single line 44 define a network of virtual transmitters/receivers 54 that is continuous along the elongation direction A.

Here, the network maintains the shape of a pseudo-line 52 along the axis Z that is perpendicular to the elongation direction A.

In one variant, the sensor 30 includes several networks of virtual transmitters/receivers 54, each forming a line or pseudo-line 52 parallel to the same elongation direction A, wherein the networks are vertically spaced apart from one another.

What is claimed is:

1. An aircraft enhanced vision system, comprising:
    at least a vision sensor of a ground in an observation direction, the ground being located in front of and below the aircraft;
    a processor configured to form a reflectivity map of the ground from data collected by the vision sensor;
    a display of ground images reconstituted by the processor from the reflectivity map and/or of information characteristic of the ground, created by the processor from the reflectivity map, the display being configured to be placed in a cockpit of the aircraft;
    the vision sensor being an electromagnetic sensor comprising:
        a plurality of transmitters of a transmitted signal, the transmitters forming at least one group of transmitters, and
        a plurality of receivers of a received signal, resulting from the transmitted signal following reflection off of the ground, the receivers forming at least one group of receivers,
        the electromagnetic sensor including a waveform generator powering each transmitter in order to generate the transmitted signal, the electromagnetic sensor being configured to capture the received signal received by each receiver, after reflection of the transmitted signal on the ground,
        the transmitters being distinct and spaced apart from the receivers, and being arranged so as to form, from each combination of one of the transmitters and one of the receivers, between the group of transmitters and the group of receivers, at least one network of virtual transmitters/receivers extending along an elongation direction perpendicular to the observation direction,
        a linear density of the virtual transmitters/receivers in the network of the virtual transmitters/receivers along the elongation direction being greater than a linear density of transmitters in the group of transmitters along the elongation direction and being greater than a linear density of receivers in the group of receivers along the elongation direction.

2. The aircraft enhanced vision system according to claim 1, wherein the transmitters are arranged at a first pitch n.P along the elongation direction in the group of transmitters, the receivers being arranged at a second pitch m.P along the elongation direction in the group of receivers, wherein the numbers n and m are prime to another integers, the network of the virtual transmitters/receivers formed from each combination of one of the transmitters and one of the receivers having a pitch P/2 along the elongation direction.

3. The aircraft enhanced vision system according to claim 1, wherein the network of the virtual transmitters/receivers is arranged in a line or pseudo-line along the elongation direction.

4. The aircraft enhanced vision system according to claim 1, wherein the electromagnetic sensor includes a first group of transmitters and a second group of transmitters, wherein the first and second groups of transmitters are adjacent and are separated by a gapped area without transmitters or receivers in the gapped area,
    and/or wherein the electromagnetic sensor includes a first group of receivers and a second group of receivers, wherein the first and second groups of receivers are separated by a gapped area without transmitters and without receivers in the gapped area.

5. The aircraft enhanced vision system according to claim 4, wherein the network of the virtual transmitters/receivers includes a first subnet exclusively comprising virtual transmitters/receivers resulting from interactions between a transmitter of the first group of transmitters and a receiver of a group of receivers, and a second subnet exclusively including virtual transmitters/receivers resulting from the interaction of a transmitter of the second group of transmitters and a receiver of the same group of receivers, wherein the first subnet of the network of the virtual transmitters/receivers extends as a continuation of the second subnet of the network of the virtual transmitters/receivers,
- or wherein the network of virtual transmitters/receivers includes a first subnet exclusively comprising virtual transmitters/receivers resulting from interactions between a transmitter of one group of transmitters and a receiver of the first group of receivers, and a second subnet exclusively including virtual transmitters/receivers resulting from the interaction of a transmitter of the same group of transmitters and a receiver of the second group of receivers, wherein the first subnet of the network of virtual transmitters/receivers extends as a continuation of the second subnet of the network of virtual transmitters/receivers.

6. The aircraft enhanced vision system according to claim 4, wherein the vision sensor includes an optical sensor arranged in the gapped area.

7. The aircraft enhanced vision system according to claim 1, wherein the group of transmitters is arranged along a line of transmitters, and the group of receivers is arranged along a line of receivers.

8. The aircraft enhanced vision system according to claim 7, wherein the line of transmitters is a curved line having a concavity, and the line of receivers is a curved line having a concavity.

9. The aircraft enhanced vision system according to claim 1, comprising at least one group of transmitters to be placed on one surface chosen among an upper surface or a lower surface of a skin of a substantially frustoconical intermediate area of a front tip of the aircraft and at least one group of receivers to be placed on the other surface chosen among an upper surface or the lower surface of the skin of the substantially frustoconical intermediate area.

10. The aircraft enhanced vision system according to claim 9, wherein the at least one group of transmitters is to be placed on an upper surface of a skin of a substantially frustoconical intermediate area of a front tip of the aircraft, wherein the at least one group of receivers is to be placed on a lower surface of the skin of the substantially frustoconical intermediate area,
- or wherein the at least one group of transmitters is to be placed on a lower surface of a skin of a substantially frustoconical intermediate area of a front tip of the aircraft, wherein the at least one group of receivers is to be placed on an upper surface of the skin of the substantially frustoconical intermediate area.

11. The aircraft enhanced vision system according to claim 1, wherein each transmitter is formed by a flush antenna configured to transmit a signal by skimming, the flush antenna lacking any moving parts.

12. The aircraft enhanced vision system according to claim 1, wherein the waveform generator is configured to simultaneously generate waveforms at frequencies with a constant offset over time for several transmitters of the group of transmitters.

13. The aircraft enhanced vision system to claim 1, wherein the waveform generator is configured to generate a periodic frequency-modulated carrier signal with a periodic waveform having an increasing and/or decreasing frequency over each period of the waveform for each transmitter.

14. The aircraft enhanced vision system according to claim 13, wherein the electromagnetic sensor is configured to generate a signal representative of a frequency difference between the transmitted signal and the received signal at all times, wherein the frequency difference between the transmitted signal and the received signal is representative of a time lag between the transmitted signal and the received signal.

15. The aircraft enhanced vision system according to claim 1, wherein the processor is configured to separate a contribution of the transmitted signal by each transmitter in the signal received on each receiver in order to restore the signal received by each virtual transmitter/receiver, and is configured to filter the signals received by the virtual transmitters/receivers depending on the direction relative to the observation direction.

16. The aircraft enhanced vision system according to claim 15, wherein the direction relative to the observation direction is a bearing relative to the observation direction.

17. The aircraft enhanced vision system according to claim 1, wherein the image of the ground restored by the processor from the reflectivity map includes a runway, and/or the information obtained from the reflectivity map restored by the processor are features of a runway.

18. An aircraft comprising:
- the aircraft enhanced vision system according to claim 1; and
- a cockpit, the display being arranged in the cockpit.

19. The aircraft according to claim 18, further comprising a substantially frustoconical intermediate area of a front tip, wherein at least one first group, selected from a group of transmitters and from a group of receivers is placed on an upper surface of a skin of the substantially frustoconical intermediate area, wherein a second group selected from the group of transmitters and the group of receivers is placed on a lower surface of the skin of the substantially frustoconical intermediate area.

20. A method for enhanced vision in an aircraft comprising:
- providing the aircraft enhanced vision system according to claim 1;
- activating the waveform generator to power each transmitter of the group of transmitters to generate a transmitted signal and activating each receiver of the group of receivers to receive a received signal formed of a transmitted signal following reflection off of the ground;
- processing, with the processor, the transmitted signal and the received signal in order to obtain signals received on the network of virtual transmitters/receivers extending in an elongation direction transverse to the observation direction;
- reconstituting, with the processor, a reflectivity map based on the signals received on the network of virtual transmitters/receivers; and
- displaying, in a cockpit of the aircraft, images of the ground reconstituted by the processor based on the reflectivity map or displaying in the cockpit of the aircraft information obtained from ground images reconstituted by the processor based on the reflectivity map.

* * * * *